United States Patent [19]

Blackburn et al.

[11] Patent Number: 5,410,663
[45] Date of Patent: Apr. 25, 1995

[54] METHOD AND SYSTEM FOR CACHE MEMORY CONGRUENCE CLASS MANAGEMENT IN A DATA PROCESSING SYSTEM

[75] Inventors: Robert A. Blackburn, North Salem; Keith N. Langston, Ulster Park; Peter G. Sutton, Yorktown Heights, all of N.Y.

[73] Assignee: International Business Machines Corporation, Armonk, N.Y.

[21] Appl. No.: 962,436

[22] Filed: Oct. 15, 1992

[51] Int. Cl.⁶ .................. G06F 12/03; G06F 12/10
[52] U.S. Cl. ............................ 395/400; 395/425; 364/243.41; 364/246; 364/255.1; 364/256.3; 364/DIG. 1
[58] Field of Search ......................... 395/400, 425

[56] References Cited

U.S. PATENT DOCUMENTS 5,119,290  6/1992  Loo et al. ..................... 395/400

Primary Examiner—Jack B. Harvey
Assistant Examiner—Michael A. Whitfield
Attorney, Agent, or Firm—William A. Kinnaman; Andrew J. Dillon

[57] ABSTRACT

A method and system for cache memory congruence class management in a data processing system. A selected address within a data processing system will typically have a single real address, but may have multiple virtual addresses within multiple virtual address spaces in a multi-tasking system, each virtual address space including a segment index, a page index and a byte index. A memory cache may be utilized to improve processor performance by hashing a portion of each virtual memory address to an address within a congruence class in the cache; however, when the cache contains a greater number of congruence classes than the number of different byte index addresses the virtual memory addresses of a single real memory address may hash to different congruence classes, reducing the ability of the processor to rapidly locate data within the cache. The method and system prevents this problem by first determining whether or not a virtual memory address exists within any virtual memory space in the system which corresponds to a selected address in real memory, in response to a request for a virtual memory address corresponding to that selected address. If such a virtual memory address already exists, a new virtual memory address is assigned such that the new virtual memory address will hash to the same congruence class as the existing virtual memory address, greatly enhancing the processor's efficiency at retrieving data within the cache. In the event no existing virtual memory address within the data processing system corresponds to the selected address a virtual memory address may be arbitrarily assigned.

7 Claims, 4 Drawing Sheets

METHOD AND SYSTEM FOR CACHE MEMORY CONGRUENCE CLASS MANAGEMENT IN A DATA PROCESSING SYSTEM

BACKGROUND OF THE INVENTION

1. Technical Field

The present invention relates in general to an improved data processing system and in particular to an improved method and system for managing data access in a data processing system. Still more particularly the present invention relates to an improved method and system for cache memory congruence class management in data processing system.

2. Description of the Related Art

Modern-state-of-the-art data processing systems often utilize a broad spectrum of memory devices. These memory devices are typically classified according to speed of access and, as those skilled in the art will appreciate, there is generally a relationship between the cost of such devices and the speed at which these devices will access data. For example, semiconductor memory devices exist which may be utilized to rapidly access data stored therein; however, the cost of these devices is typically quite high. In contrast, so-called "Direct Access Storage Devices" (DASD) are capable of storing large amounts of data; however, the access time for retrieving data within such devices is generally quite high when compared to semiconductor memory circuits.

Thus, the design of a modern state-of-the-art data processing system incorporates a continuous compromise between cost and speed in terms of the memory devices utilized. It is quite common for such systems to utilize a broad spectrum of memory devices for specific purposes and in a specific manner in an attempt to create a data processing system having the most efficient combination of cost and speed which is possible.

One method which is often utilized by system designers in an attempt to increase the effective speed at which slower memory devices may be accessed is the utilization of a so-called "cache" memory. A cache memory system is utilized to temporarily store small amounts of data within high speed memory in anticipation of an access request for that data. Such cache memory systems are typically quite small in size when compared with overall system memory; however, by choosing the size of a cache memory system carefully and by efficiently determining what data should be stored within cache memory over eighty percent of all data accesses within a system may result in a cache access, greatly enhancing the efficiency of the processor.

One method by which data within a cache memory system is more rapidly accessed and retrieved is the utilization of an associative storage system. An associative storage system is a system in which storage locations within the system are identified by their contents or by a portion of their contents, rather than by names or positions. Thus, if an attempted access of data includes an identification of the data which is sought, an associative storage system utilized as a cache may result in greater efficiency in retrieving that data. Data is often stored within an associative cache memory system utilizing a so-called "hash" function. A hash function is a function which is utilized to transform a search key into a table address. Ideally, different search keys will map to different addresses; however, many hash functions result in situations in which two or more different keys hash to the same table address. Thus, a hashing search typically includes a "collision-resolution" process which deals with such situations. Hashing functions may be utilized in a data processing system to greatly enhance the efficiency of a processor in retrieving selected data within the data processing system.

One application of an associative cache memory and hash function for controlling access to multiple data addresses occurs in situations in which data within a single real memory address is mapped to multiple different virtual memory addresses. For example, in a multi-tasking system a single location within real memory may map to multiple different addresses within different virtual memory spaces, wherein each virtual memory space is associated with a particular task within the multi-tasking system. In such systems, the virtual memory and real memory addresses often include multiple portions, such as a segment index, a page index and a byte index. A hash function is then typically applied to a particular portion of the system address, such as the byte index.

This technique results in a great deal of efficiency in situations in which the byte index comprises twelve bits. A twelve bit byte index corresponds to 4,096 (4K) different possible addresses and thus, a cache memory system having 4,096 (4K) columns may be efficiently utilized to store references to different virtual memory addresses. By providing a cache memory containing 4 rows and 4K columns, up to four different virtual memory addresses, each having an identical byte index, may be "hashed" to a single column within the cache memory system. In such a system, the single column is referred to as a "congruence class" in that multiple virtual addresses corresponding to a single real address will all map to a single congruence class within a cache memory, if the cache memory is sized appropriately for the address scheme utilized.

However, more advanced data processing systems, such as the International Business Machines Corporation 3090 and 9000 series processors require the utilization of larger cache memories. In such a situation the cache may comprise 4 rows by 32K columns for example and, as a result, additional bits within the virtual memory address are often utilized to hash to a location within the cache memory. By utilizing n additional bits for the hash function those skilled in the art will appreciate that up to $2^n$ different results may occur from the application of the hash function. Thus, eight different virtual memory addresses, each corresponding to a single real memory address, may hash to eight different congruence classes within a cache memory. In such a situation, an attempted processor access of a particular virtual memory address will result in a substantial delay in view of the fact that many different congruence classes must be examined.

Upon reference to the foregoing those skilled in the art will appreciate that a need exists for a method and system wherein multiple virtual memory addresses, each corresponding to a single real memory address, may be hashed to a single congruence class within an enlarged cache memory system.

SUMMARY OF THE INVENTION

It is therefore one object of the present invention to provide an improved data processing system.

It is another object of the present invention to provide an improved method and system for managing data accessing in a data processing system.

It is yet another object of the present invention to provide an improved method and system for cache memory congruence class management in a data processing system.

The foregoing objects are achieved as is now described. The method and system of the present invention may be utilized for cache memory congruence class management in a data processing system. A selected address within a data processing system will typically have a single real address, but may have multiple virtual addresses within multiple virtual address spaces in a multi-tasking system, each virtual address space including a segment index, a page index and a byte index. A memory cache may be utilized to improve processor performance by hashing a portion of each virtual memory address to an address within a congruence class in the cache; however, when the cache contains a greater number of congruence classes than the number of different byte index addresses the virtual memory addresses of a single real memory address may hash to different congruence classes, reducing the ability of the processor to rapidly locate data within the cache. The method and system of the present invention prevents this problem by first determining whether or not a virtual memory address exists within any virtual memory space in the system which corresponds to a selected address in real memory, in response to a request for a virtual memory address corresponding to that selected address. If such a virtual memory address already exists, a new virtual memory address is assigned such that the new virtual memory address will hash to the same congruence class as the existing virtual memory address, greatly enhancing the processor's efficiency at retrieving data within the cache. In the event no existing virtual memory address within the data processing system corresponds to the selected address a virtual memory address may be arbitrarily assigned.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
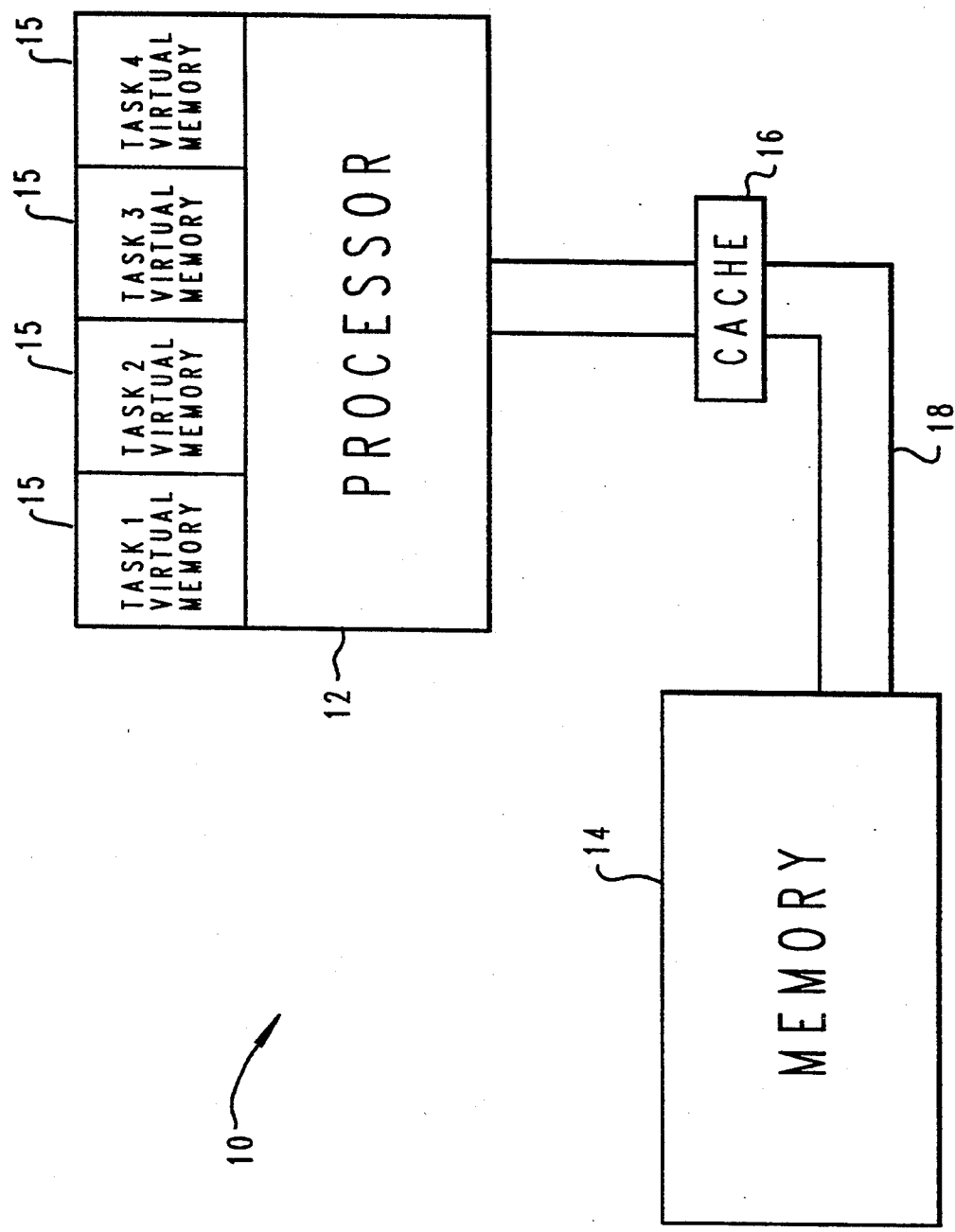
FIG. 1 is a high level pictorial block diagram of a data processing system which may be utilized to implement the method and system of the present invention.

With reference now to the figures and in particular with reference to FIG. 1, there is depicted a high level pictorial block diagram of a data processing system 10 which may be utilized to implement the method and system of the present invention. As illustrated, data processing system 10 includes a processor 12 which is capable of processing multiple tasks. System real memory 14 is coupled to processor 12 via bus 18 and cache memory 18 is interposed between system real memory 14 and processor Thus, in a process well known to those having skill in the art, a request for a data access by processor 12 will be coupled to cache 16. If the data requested is within cache 16 that data will be returned to processor 12; however, if the data requested is not within cache 16 that data will be retrieved from system real memory 14 and placed within cache 16 for utilization by processor 12.

As illustrated, multiple virtual memory spaces may be associated with data processing system 10. For example, each task within data processing system 10 may have a virtual memory space associated therewith, such as task virtual memory spaces 15. Thus, multiple virtual memory spaces may exist, each of which may include a virtual memory address which corresponds to a single real memory address within system real memory 14.

Figure 2:
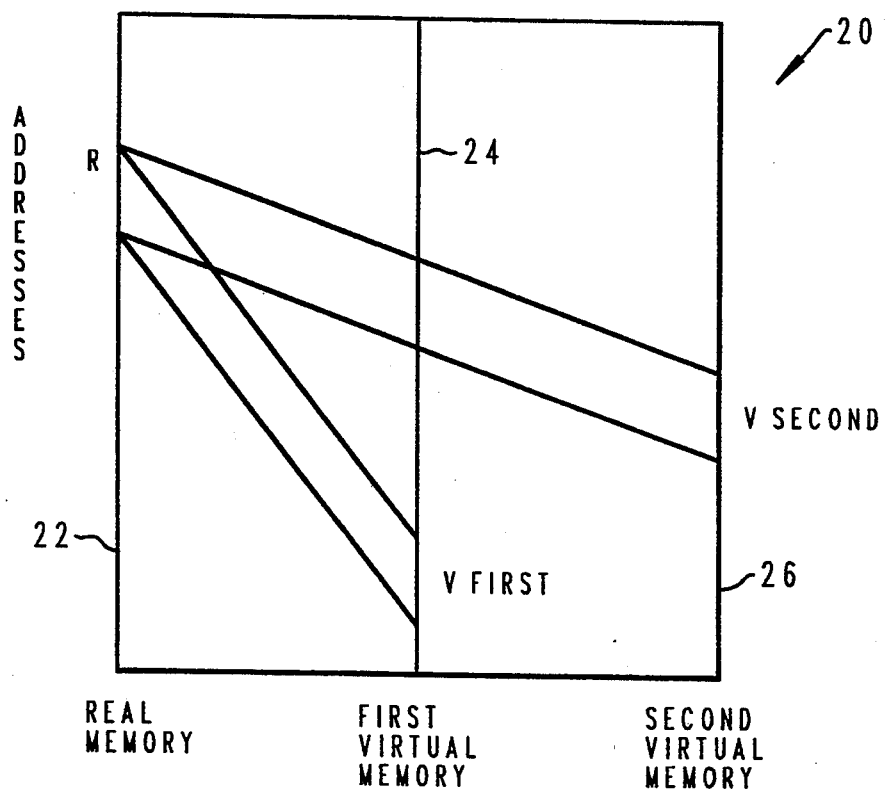
FIG. 2 is a prior art pictorial representation of a single real memory address which corresponds to two different virtual memory addresses.

Referring now to FIG. 2, there is depicted a pictorial representation of an address space 20 in which a single real memory address corresponds to two different virtual memory addresses, in a manner described above. As illustrated, real memory address R, indicated along the linear depiction of real memory 22 may map to a virtual memory address "V FIRST" along within first virtual memory 24 and a second virtual memory "V SECOND" within second virtual memory 26 within address 20, as depicted.

In situations such as that depicted within FIG. 2, a cache memory system may still be utilized to rapidly and efficiently locate data stored at selected virtual memory addresses by assigning virtual memory addresses which include identical byte index segments. Thus, when each virtual memory address assigned in this manner is hashed utilizing an arithmetic hash function to store that data within cache memory 16, first virtual memory "V FIRST" and second virtual memory "V SECOND" will hash to a single column or congruence class 28 within cache memory 16. Thus, as indicated at reference numerals 30 and 32, both virtual memory addresses corresponding to a single real memory address will be hashed to the same congruence class within cache memory 16. The manner in which this is accomplished will be explained in greater detail with reference to FIG. 4.

Figure 4:
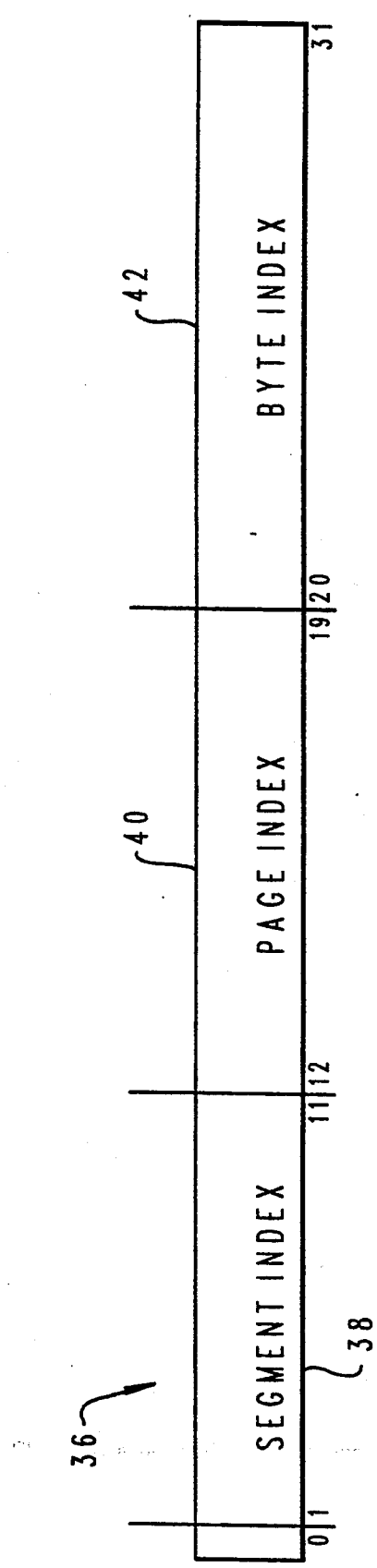
FIG. 4 is a pictorial representation of an address scheme typically utilized in a modern state-of-the-art data processing system.

FIG. 4 depicts a pictorial representation of an address scheme which may be utilized in a modern state-of-the-art data processing system. As illustrated, a particular address within the data processing system includes thirty-two bits. For virtual address purposes bit 0 is ignored. As illustrated, a segment index 38 comprises bits 1-11. Similarly, a page index 40 comprises bits 12-19 and a byte index 42 comprises bits 20-31.

Figure 3:
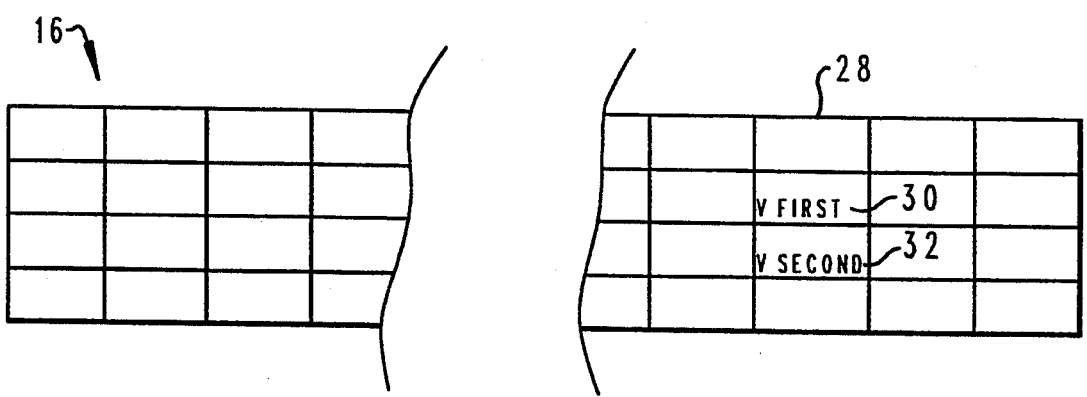
FIG. 3 is a pictorial representation of a prior art cache memory system in which multiple virtual memory addresses corresponding to a single real memory address hash to a single congruence class.

As is typical in some virtual memory systems, the virtual memory address assigned to correspond to a particular real memory address will generally have a different value for segment index 38 and page index 40; however, byte index 42 will be identical to the corresponding index within the real memory address. Thus, as depicted within FIG. 3, if cache memory 16 is provided by a 4 row by 4K cache memory, 4,094. different columns will exist within cache memory 16. The twelve bits which make up byte index 42 constitute 4,096 different values and thus each virtual memory address within the system which corresponds to a single real memory address will include an identical byte index. A straightforward arithmetic hash function will then hash those virtual memory addresses to a single congruence class 28 (see FIG. 3) within cache memory 16.

Figure 5:
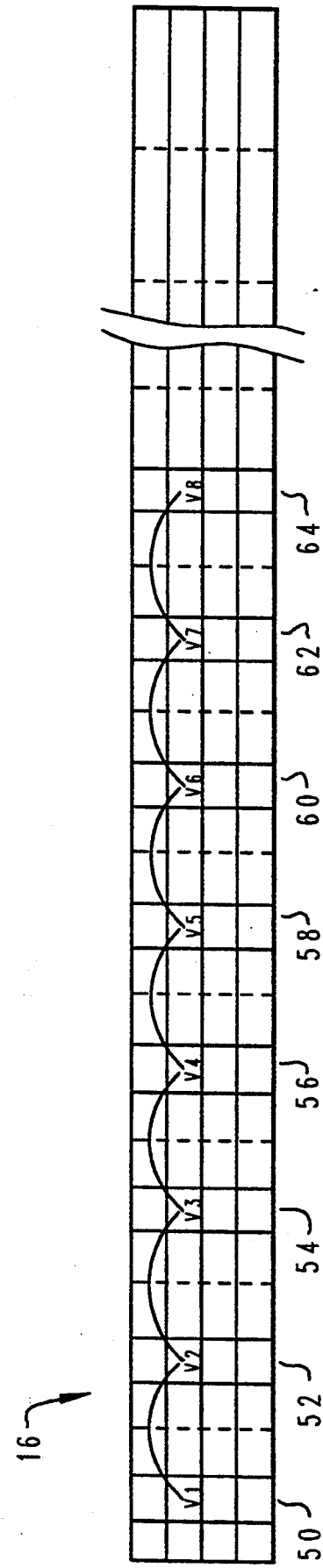
FIG. 5 is a pictorial representation of an enlarged cache in which multiple virtual memory addresses corresponding to a single real memory address hash to different congruence classes within the cache.

The aforementioned technique works quite well with cache memory systems which have been sized according to the byte index of a particular addressing scheme; however, certain modern processors require the utilization of much larger cache memory systems. For example, as depicted within FIG. 5, an enlarged cache 16 is illustrated. Cache 16 within FIG. 5 is comprised of 4 rows and 32K columns, for a total cache capacity of 128K. In order to hash a virtual memory address of the format depicted within FIG. 4 into a cache of the size depicted within FIG. 5, additional bits of page index 40 may be required. Those skilled in the art will then appreciate that by applying a hash function to the 12 bits within byte index 42 and n additional bits within page index 40, a plurality of virtual memory addresses which each correspond to a single real memory address may hash up to $2^n$ different congruence classes. Thus, as depicted within FIG. 5, virtual addresses V1-V8, which all correspond to a single real memory address may hash to congruence classes 50, 52, 54, 56, 58, 60, 62, and 64 respectively, in one worst case scenario. It should thus be apparent that an attempt by the processor to access data stored within cache 16 will be rendered much less efficient by the possibility that that data may reside in one of many different congruence classes within cache 16.

Figure 6:
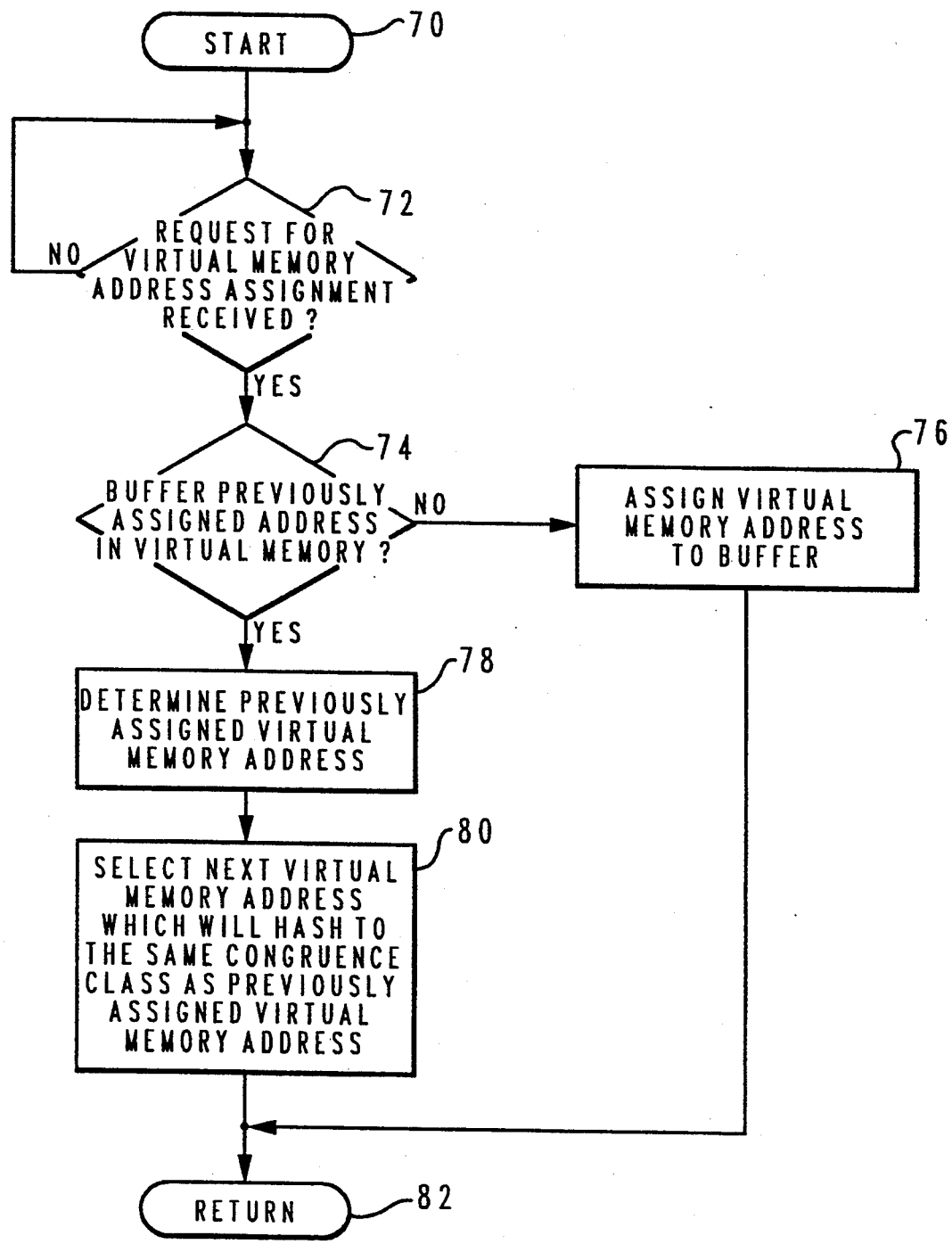
FIG. 6 is a high level logic flowchart depicting the method and system of the present invention wherein multiple virtual memory addresses corresponding to a single real memory address may be hashed to a single congruence class within cache memory.

Finally, with reference to FIG. 6, there is depicted a high level logic flowchart which illustrates the method and system of the present invention wherein multiple virtual memory addresses corresponding to a single real memory address may be hashed to a single congruence class within hash memory regardless of cache memory dimensions. As depicted, the process begins at block 70 and thereafter passes to block 72. Block 72 illustrates a determination of whether or not a request for a virtual memory address assignment for a real memory address buffer has been received. If not, this process merely iterates until such time as such a request is received.

Upon receiving a request for a virtual memory address assignment from a task within data processing system 10 (see FIG. 1) the process passes to block 74. Block 74 illustrates a determination of whether or not the address buffer has previously been mapped to or assigned a virtual address within any virtual memory space within data processing system 10. If not, the process passes to block 76 which illustrates the assigning of an arbitrary virtual memory address to the buffer in question, and the process then passes to block 82 and returns.

In accordance with an important aspect of the present invention, if the address buffer in question has previously been assigned a virtual address within a different virtual memory space, the process passes to block 78. Block 78 illustrates the determination of the previously assigned virtual memory address and, consequently, the congruence class within the cache memory containing that virtual memory address. Next, the process passes to block 80. Block 80 illustrates the intelligent selection of the next virtual memory address which will correspond to the same address buffer within real memory, as an address which will hash to the same congruence class as the previously assigned virtual memory address. The process then passes to block 82 and returns.

Upon reference to the foregoing those skilled in the art will appreciate that in a simple arithmetic hash function the utilization of additional bits from the page or segment index of a virtual address which may differ from the page or segment bits within another virtual memory address may result in hashing that virtual address to a separate congruence class. By selectively requiring the page or segment bits utilized within the hashing function to be identical for a subsequent virtual memory address request which corresponds to the same selected real memory address all virtual memory addresses corresponding to a single real memory address will hash to the same congruence class.

However, more complex hash functions exist and those skilled in the art, upon reference to the foregoing, will appreciate that knowledge of the manner in which a particular hash function operates may be utilized to ensure that a subsequent virtual memory address will hash to the same congruence class within the cache memory as a previous virtual memory address which corresponds to the same real memory address by intelligently assigning the second virtual memory address, taking into account the parameters utilized by the particular hash function, in those situations in which a previously obtained virtual memory address exists within the data processing system. In this manner, processor accessing of data within cache memory may be greatly enhanced, while permitting enlarged cache memory systems to be utilized.

While the invention has been particularly shown and described with reference to a preferred embodiment, it will be understood by those skilled in the art that various changes in form and detail may be made therein without departing from the spirit and scope of the invention.

We claim:

1. A method for cache memory congruence class management in a data processing system having a processor for processing multiple tasks, a real memory space, multiple virtual memory spaces each corresponding to a selected one of said multiple tasks, a cache memory of a size having multiple congruence classes therein such that virtual memory addresses having identical byte indices may hash to different congruence classes within said cache memory and a hash function for transforming a virtual memory address into a cache address within said cache memory contained within a selected congruence class among said multiple congruence classes, said method comprising the steps of:

determining if an existing virtual memory address in any virtual memory space within said data processing system corresponds to a selected address within said real memory space in response to a request for a virtual memory address corresponding to said selected address;

assigning an arbitrary virtual memory address corresponding to said selected address in an absence of any existing virtual memory address which corresponds to said selected address;

determining a selected congruence class within said cache memory which contains an existing cache address therein for the existing virtual memory address corresponding to said selected address in response to a presence of the existing virtual memory address within said date processing system which corresponds to said selected address; and assigning a particular virtual memory address corresponding to said selected address in response to the presence of the existing virtual memory address within said data processing system which corresponds to said selected address, wherein said particular virtual memory address is chosen such that a transformation of said particular virtual memory address by said hash function will result in a cache address within said cache memory within said selected congruence class.

2. The method for cache memory congruence class management in a data processing system according to claim 1, wherein each virtual memory address within said data processing system includes a segment index, a page index and a byte index and said hash function transforms said byte index and a selected portion of said page index into a cache address within said cache memory, wherein said step of assigning a particular virtual memory address corresponding to said selected address comprises the step of assigning a virtual memory address having an identical byte index and selected portion of said page index as said existing virtual memory address within said data processing system.

3. The method for cache memory congruence class management in a data processing system according to claim 1, wherein said cache memory comprises a 4 row by 32K column cache and wherein said step of determining a selected congruence class within said cache memory which contains an existing cache address therein for an existing virtual memory address corresponding to said selected address comprises identifying which of said 32K columns contains said address.

4. A system for cache memory congruence class management in a data processing system having a processor for processing multiple tasks, said system comprising:

a real memory space within said data processing system;

multiple virtual memory spaces within said data processing system each corresponding to a selected one of said multiple tasks;

a cache memory having multiple congruence classes therein such that virtual memory addresses having identical byte indices may hash to different congruence classes within said cache memory;

means within said processor for performing a hash function for transforming a virtual memory address into a cache address within said cache memory contained within a selected congruence class among said multiple congruence classes;

means within said processor for determining if an existing virtual memory address in any virtual memory space within said data processing system corresponds to a selected address within said real memory space in response to, a request for a virtual memory address corresponding to said selected address;

means within said processor for assigning an arbitrary virtual memory address corresponding to said selected address in an absence of any existing virtual memory address which corresponds to said selected address;

means within said processor for determining a selected congruence class within said cache memory which contains an existing cache address therein for the existing virtual memory address corresponding to said selected address in response to a presence of the existing virtual memory address within said data processing system which corresponds to said selected address; and means within said processor for assigning a particular virtual memory address corresponding to said selected address in response to the presence of the existing virtual memory address within said data processing system which corresponds to said selected address, wherein said particular virtual memory address is chosen such that a transformation of said particular virtual memory address by said hash function will result in a cache address within said cache memory within said selected congruence class.

5. The system for cache memory congruence class management in a data processing system according to claim 4, wherein said cache memory comprises a 4 row by 32K column cache memory.

6. The system for cache memory congruence class management in a data processing system according to claim 5, wherein said means within said processor for determining a selected congruence class within said cache memory which contains an existing cache address therein for the existing virtual memory address corresponding to said selected address comprises means for identifying which of said 32K columns contains said address.

7. The system for cache memory congruence class management in a data processing system according to claim 4, wherein each virtual memory address within said data processing system includes a segment index, a page index, and a byte index and said hash function transforms said byte index and a selected portion Of said page index into a cache address within said cache memory, wherein said means within said processor for assigning a particular virtual memory address corresponding to said selected address comprises means within said processor for assigning a virtual address having an identical byte index and selected portion of said page index as said existing virtual memory address within said data processing system.

* * * * *